United States Patent
Johnson et al.

(10) Patent No.: US 6,857,308 B2
(45) Date of Patent: Feb. 22, 2005

(54) VALVE TECHNOLOGY

(75) Inventors: Martin S. Johnson, Itchington (GB); Ulrich Fink, Schorndorf (DE)

(73) Assignee: IMI Vision Limited, Alcester (GB)

( * ) Notice: Subject to any disclaimer, the term of this patent is extended or adjusted under 35 U.S.C. 154(b) by 0 days.

(21) Appl. No.: 10/726,161

(22) Filed: Dec. 2, 2003

(65) Prior Publication Data

US 2004/0107767 A1 Jun. 10, 2004

(51) Int. Cl.⁷ .......................... G01M 3/04; F16K 37/00; F17D 3/00; E03B 7/07
(52) U.S. Cl. ............................... 73/40; 73/47; 137/557
(58) Field of Search ............................... 73/313, 40, 47; 277/500; 137/551, 557

(56) References Cited

U.S. PATENT DOCUMENTS 3,788,127 A * 1/1974 Marsh ........................... 73/40
6,134,949 A   10/2000 Leon et al. ................ 73/40.5 A
2003/0011136 A1 * 1/2003 Ramirez et al. ............ 277/500

FOREIGN PATENT DOCUMENTS

EP           0294157 A1    12/1988    ............. G01F/1/36

* cited by examiner

Primary Examiner—Hezron Williams
Assistant Examiner—Tamiko Bellamy
(74) Attorney, Agent, or Firm—Pyle & Piontek

(57) ABSTRACT

A fluid flow control valve is provided with means for detecting and quantifying valve seat leakage when the valve is in its closed position. Any fluid leaking past the seat flows through an orifice of known, fixed dimensions present downstream of the seat when the valve is in its closed position. Pressure transducers measure a first pressure immediately upstream of the seat, a second pressure between the seat and the orifice, and a third pressure immediately downstream of the orifice. The second and third pressures are used to calculate flow through the orifice, and the calculated flow is used with the first and second pressures to determine the size of a leak path across the seat.

20 Claims, 5 Drawing Sheets

VALVE TECHNOLOGY

FIELD OF THE INVENTION

This invention relates to the detection of valve seat leakage in a fluid flow control valve, especially but not exclusively a severe service valve, when the valve is in its fully closed position.

BACKGROUND OF THE INVENTION

Seat leakage is a major problem associated with severe service valves and one which can have a considerable cost to the user. Normally it is not possible to change a leaking valve or remedy the problem without shutting down the facility. This has a huge cost implication for such facilities as power stations, chemical plants and the like. It is, therefore, beneficial for users to be able to identify leaks and then monitor them over a period of time, thereby allowing necessary maintenance to be timetabled in with scheduled shutdowns. In addition, monitoring leaks enables a better understanding of efficiencies within the plant and how they can be improved.

Current methods for detecting leakage of valves have a number of problems associated with them. One method is to use infra-red imagery that comprises taking an image of the valve and adjacent pipework and visually looking at the varying temperatures. Leakage is manifested as a hot area extending downstream from the valve in the vicinity of the valve seat. This method enables leaks to be detected but requires the removal of the thermal insulation that usually surrounds the pipework and valve. In addition, while good for detecting leaks, it is not a reliable method for quantifying their size.

A second method is the use of ultrasonics. Again this is a good method of identifying a leak and works well in a laboratory situation, but in a noisy industrial environment, where sound is likely to be propagated along the pipes connected to the valves, it is not easy to obtain reliable enough results using this method.

SUMMARY

According to a first aspect of the present invention, there is provided a fluid flow control valve provided with means for detecting and quantifying valve seat leakage when the valve is in its closed position, said means including first means for measuring pressure immediately upstream of the seat, an orifice of known, fixed dimensions present when the valve is in its closed position and located downstream of the seat, through which orifice any fluid leaking past the seat flows, second means for measuring pressure between the seat and the orifice and third means for measuring pressure immediately downstream of the orifice.

The orifice is preferably an annular orifice that, when the valve is in its closed position, is defined between a cylindrical extension of the valve closure extending downstream of the seat and a cylindrical wall of the outlet of the valve defined by the valve body, whereby, as the valve is opened, the cylindrical extension withdraws from the outlet such that, at least when the valve is fully open, the orifice ceases to be present and so does not interfere with the flow of fluid through the valve.

From the second and third means for measuring pressure and the known orifice size, the flow through the orifice can be determined by known mathematical methods. Using this calculated flow, and the values from the first and second means for measuring the pressure, the size of the seat leakage can be quantified. The monitoring of the size of the leak is also indicative of seat erosion and may be used as an indicator for other faults in the system.

Preferably, each means for measuring pressure are pressure transducers which are preferably mounted externally of the valve with respective fluid paths connecting the pressure transducers to the regions where the pressure is to be measured, thus easing servicing of the pressure transducers. Preferably, the fluid paths are bores formed in the valve closure which, at their respective lower ends, open into those regions and at their respective upper ends interface with the respective pressure transducers mounted on the closure. In that way, conventional valves may readily be adapted, e.g. during servicing, into a valve of the invention by retrofitting an appropriate closure, which, for example, may be a plunger or a screw-threaded spindle. In another arrangement, one or more of the pressure transducers may be mounted separately from the closure in the regions where the pressure is to be measured or connected to those regions by respective fluid paths.

A valve of the invention allows continuous monitoring of seat leakage. For that purpose, for example, the electrical outputs of the aforesaid pressure transducers may be fed to a processor programmed to calculate and give the desired leakage information. An advantage of this is that the detection and quantification of any leakage can be carried out while the valve remains in its operating environment.

According to a second aspect of the present invention, there is provided a method for quantifying valve seat leakage when a fluid flow control valve is closed, the method comprising the steps of providing a fixed orifice of known size downstream of the valve seat when the valve is closed through which orifice any fluid leaking past the seat flows, measuring a first pressure upstream of the seat, measuring a second pressure between the seat and the orifice, measuring a third pressure immediately downstream of the orifice, using the second and third pressure to calculate flow through the orifice, and using the first and second pressures and the calculated flow through the orifice to determine the size of a leak path across the seat.

For some applications of the invention, it may only be necessary to measure mass flow as opposed to quantification of the size of the leak. In this case, the step of measuring the first pressure upstream of the seat may be omitted from the above described method and the first means for measuring pressure immediately upstream of the seat may be omitted from the above described fluid flow control valve.

Thus, according to a third aspect of the invention, there is provided a method for quantifying valve seat leakage when a fluid flow control is closed, the method comprising the steps of providing, at least when the valve is closed, a fixed orifice of known sized downstream of the valve seat through which orifice any fluid leaking past the seat flows, measuring a first pressure between the seat and the orifice, measuring a second pressure immediately downstream of the orifice and using the first and second pressures to calculate flow through the orifice and hence the mass flow through any leak across the valve seat.

Additionally, according to a fourth aspect of the present invention, there is provided a fluid flow control valve provided with means for detecting and quantifying valve seat leakage when the valve is in its closed position, said means including an orifice of known, fixed dimensions present at least when the valve is in its closed position and located downstream of the seat, through which orifice any fluid leaking past the seat flows, first means for measuring pressure between the seat and the orifice and second means for measuring pressure immediately downstream of the orifice.

The orifices and pressure measuring means of the third and fourth aspects of the invention are preferably the same as the corresponding orifices and pressure measuring means described above in connection with the first and second aspects of the invention.

Embodiments of the invention will now be described, by way of example only, with reference to the accompanying drawings.

DETAILED DESCRIPTION OF THE EXEMPLARY EMBODIMENTS

Figure 1:
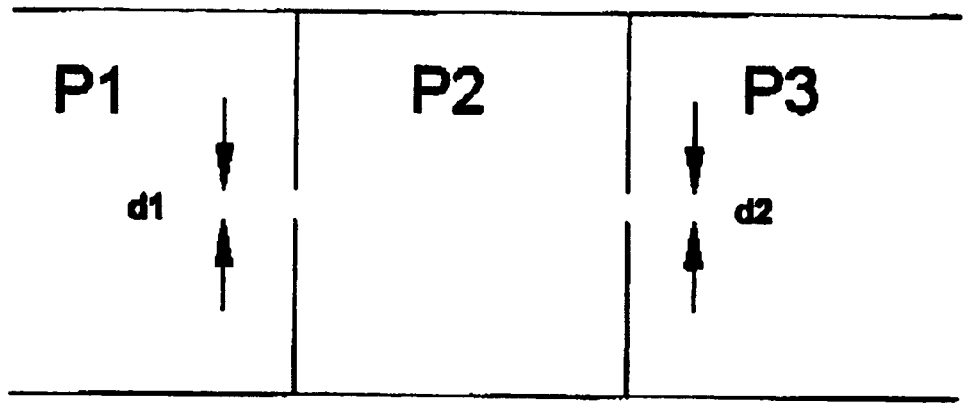
FIG. 1 is a diagram for use in explaining the principle behind the invention.

Referring to FIG. 1, this represents a leakage path of dimension d1 between the valve seat and the valve closure and d2 is the known dimension of a fixed orifice located downstream of the leakage path. P1 is the pressure upstream of the leakage path, P2 is the pressure between the leakage path and the fixed orifice and P3 is the pressure downstream of the fixed orifice. Knowing P2 and P3 and knowing d2 it is possible to calculate the fluid flow through d2 using mathematical methods common in fixed orifice flow meters. As flow through d1 must equal flow through d2 it is possible knowing P1 and P2 to calculate an equivalent annular orifice size for d1.

Figure 2:
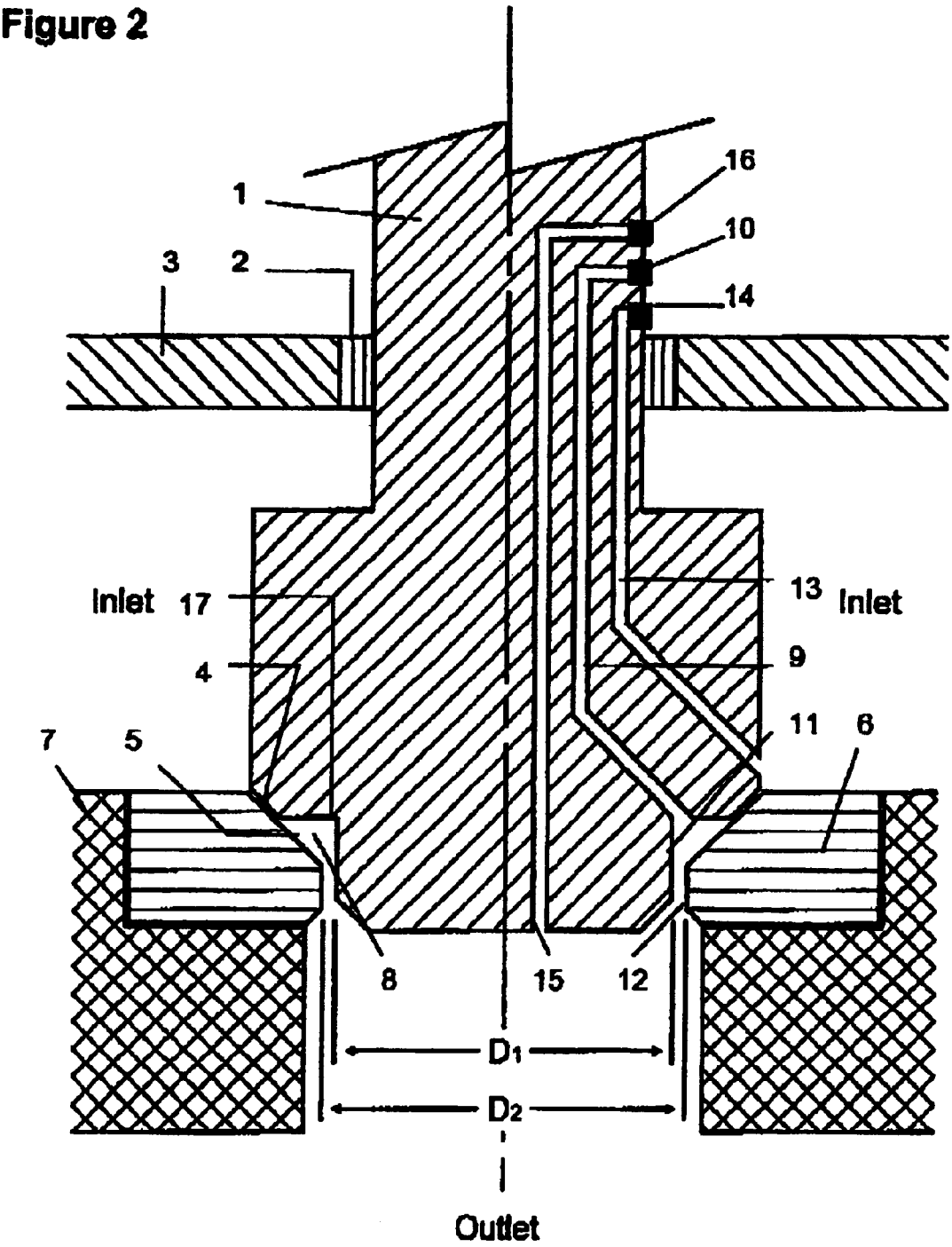
FIG. 2 is a sectional view of a valve seat/closure of a valve constructed in accordance with the invention.

Referring to FIG. 2, a valve seat/closure arrangement is shown comprising a plunger 1 that passes through a shaft seal 2 in the upper valve body 3. The lower part of the plunger 1 is profiled to form an angular sealing surface 4 that matches surface 5 in the valve seat ring 6, which sits in the lower valve body 7. The plunger 1 is movable in the direction of its axis to lift on and off the seat ring 6, opening and closing the valve. Below the angular sealing surface 4 is a step detail 17 on the plunger 1 which provides a small cavity 8 from which a passageway 9 communicates with a pressure transducer 10 forming the second means for measuring the pressure P2. Below the step detail 17 is a parallel section 11 of the plunger 1 which passes through the inner diameter 12 of the seat ring 6, forming the orifice of known dimension, determined by the difference in diameter between the outer diameter $D_1$ of the plug and the inner diameter $D_2$ of the seat ring. Additionally there are two further passageways passing through the plunger 1. One, 13, communicates between the valve inlet from a position immediately above the seat to a pressure transducer 14, and the other, 15, communicates between the valve outlet and a pressure transducer 16, the pressure transducers 14 and 16 being the first and third pressure measuring means for measuring the pressures P1 and P3 respectively. The three outputs from the pressure transducers 10, 14 and 16 act as inputs to some circuitry (not shown) which, using the information from these inlets along with the known orifice size, performs an algorithm on the data, the result of which quantifies the leak.

Figure 4:
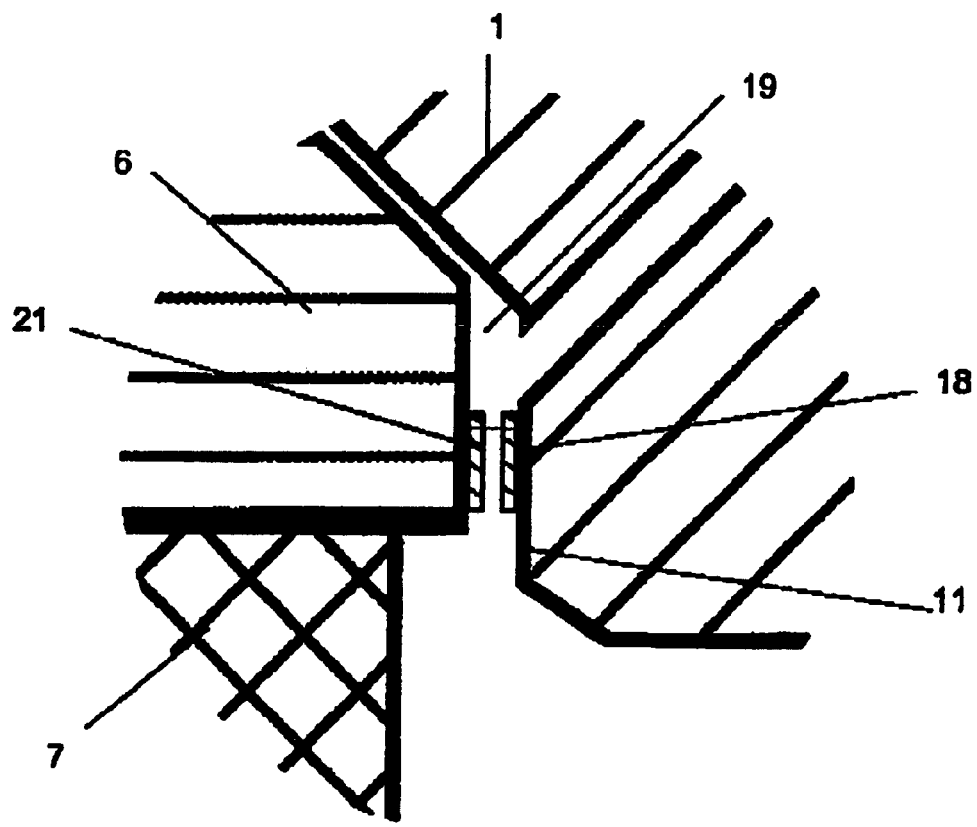
FIG. 4 is an enlarged view of part of FIG. 3.
Figure 3:
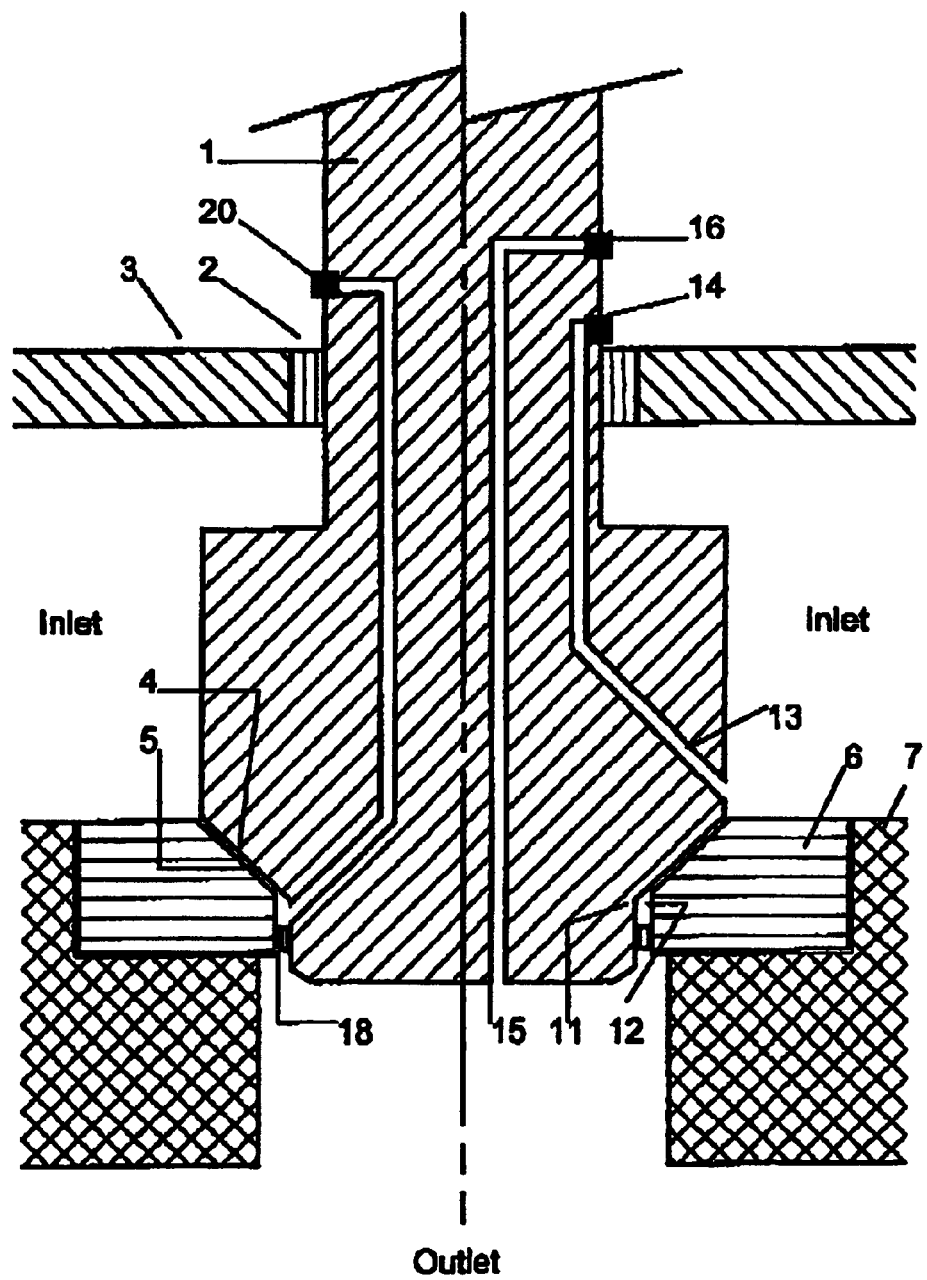
FIG. 3 is a sectional view of an alternative seat/closure of a valve constructed in accordance with the invention.

Referring to FIGS. 3 and 4, the valve seat arrangement shown is similar to that of FIG. 1. However, situated in the section between the parallel section 11 of the plunger 1 and the inner diameter 12 of the seat ring 6 is a means of closing the gap therebetween, in this case a piston ring 18 such that a small cavity 19 is formed above the piston ring 18 and below the seat. A passageway communicates from this cavity through the plug to a pressure transducer 20 which measures pressure P2. There is provided in the piston ring 18 an orifice 21 of known size d2 allowing fluid to flow from the cavity 19 to the valve outlet. Additionally there are two further passageways passing through the plunger 1. One, 13, communicates between the inlet from a position immediately above the seat to a pressure transducer 14 measuring pressure P1. The second passageway 15 communicates between the outlet and a pressure transducer 16 measuring P3. Again, the three outputs from the pressure transducers act as inputs to some circuitry (not shown) which, using the information from these inlets along with the known orifice size, performs an algorithm on the data, the result of which quantifies the leak.

Figure 5:
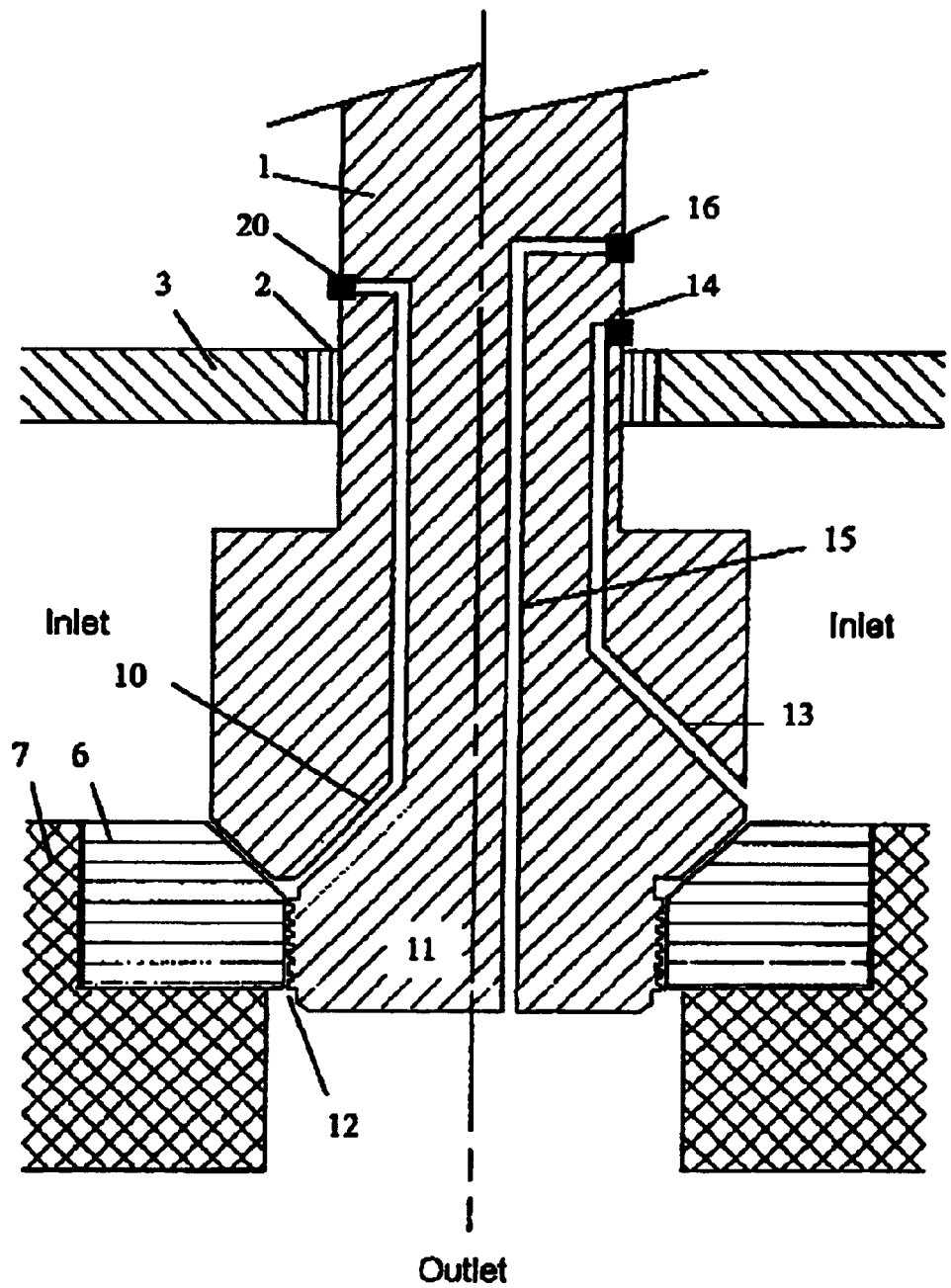
FIG. 5 is a sectional view of a second alternative seat/closure of a valve constructed in accordance with the invention.
Figure 6:
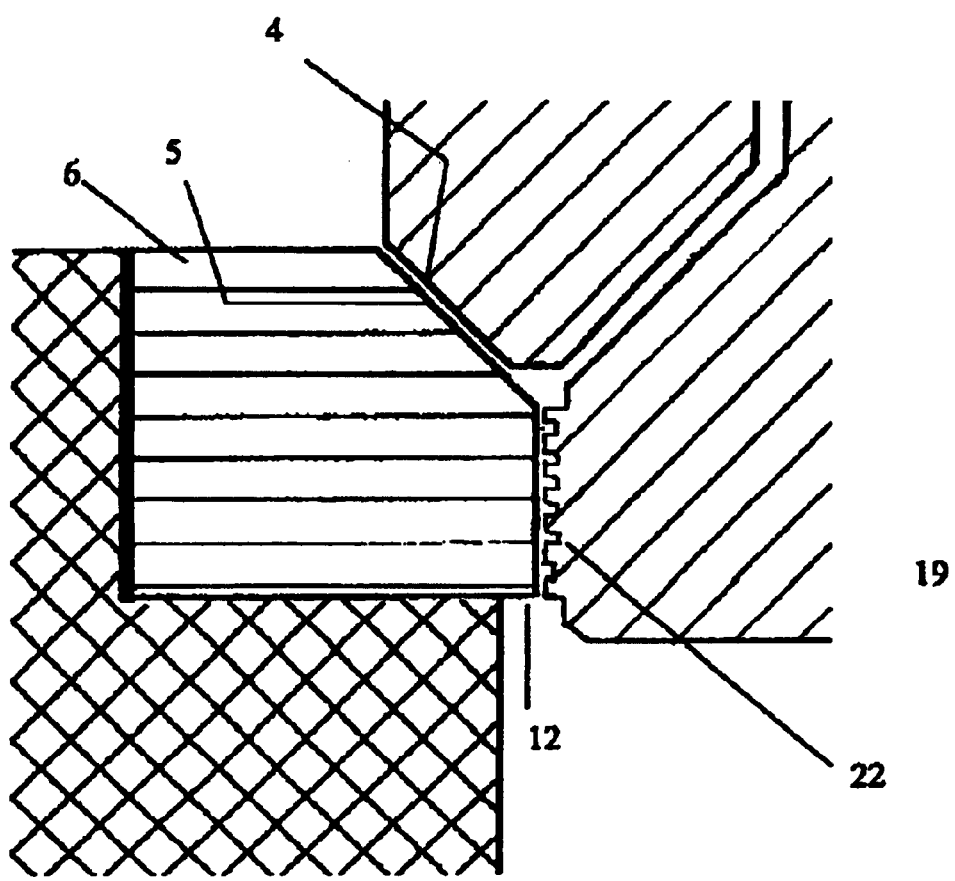
FIG. 6 is an enlarged view of part of FIG. 5.

Referring to FIGS. 5 and 6, a valve seat/closure arrangement is shown in which the orifice on the outlet side of the plunger 1 is replaced with a torturous path. The torturous path has the same effect as an orifice in creating a pressure differential that a flow rate can be calculated from but which is less susceptible to effects of dirt in the air than a small orifice. The valve seat arrangement is shown comprising a plunger 1 that passes through a shaft seal 2 in the upper valve body 3. The lower part of the plunger 1 is profiled such that it forms an angular sealing surface 4 which matches surface 5 in the valve seat ring 6, which sits in the lower valve body 7. The plunger 1 is movable in the direction of its axis to lift on and off the seat ring, opening and closing the valve. Below the angular surface 4 is a parallel section 11 of the plunger 1 that passes through the inner diameter 12 of the seat ring. Provided in this parallel section is a profile 22 that creates the torturous path, creating a pressure drop as fluid flows past it. Situated between the valve seat and the torturous path is a small cavity 19 from which a passageway 10 communicates with a pressure transducer 20 which measures P2. Additionally there are two further passageways passing through the plunger. One, 13, communicates between the inlet from a position immediately above the seat to a pressure transducer 14 measuring pressure P1. The second passageway 15 communicates between the outlet and a pressure transducer 16 measuring P3. Again, the three outputs from the pressure transducers act as inputs to some circuitry (not shown) which, using the information from these inlets along with the known orifice size, performs an algorithm on the data, the result of which quantifies the leak.

For some applications of the invention, it may be sufficient to measure the mass flow as opposed to quantifying the size of the leak. In this case, the pressure P1 upstream of the valve seat is not required and the pressure transducer 14 may be omitted and the circuitry programmed accordingly. In other respects, the control valve, in particular the orifice and pressure measuring means are as described previously. Alternatively, the circuitry may be programmed to either accept or reject (ignore) the output from the pressure transducer 14 according to user selection. In this way, either the size of the leak can be quantified or the mass flow measured as desired.

The arrangements described herein have the advantage that the detection and quantification of any leakage can be carried out while the valve remains in its operating environment and can be monitored continuously.

Although the invention has been described with reference to the best modes presently known to the applicant, it will be understood that the invention is not limited thereto. For example, any changes having no material effect on the operation of the invention are considered to be within the scope of the invention. In particular, replacing any parts described herein with parts that are equivalent or perform an equivalent function either separately or in combination is within the scope of the invention.

What is claimed is:

1. A fluid flow control valve provided with means for detecting and quantifying valve seat leakage when the valve is in its closed position, said means including first means for measuring pressure immediately upstream of the seat, an orifice of known, fixed dimensions present when the valve is in its closed position and located downstream of the seat, through which orifice any fluid leaking past the seat flows, second means for measuring pressure between the seat and the orifice and third means for measuring pressure immediately downstream of the orifice.

2. A fluid flow control valve according to claim 1 wherein the orifice is an annular orifice defined between a cylindrical extension of the valve closure extending downstream of the seat and a cylindrical wall of the outlet of the valve defined by the valve body when the valve is in its closed position.

3. A fluid flow control valve according to claim 1 wherein the orifice is formed in a piston ring that is located between a cylindrical extension of the valve closure and a cylindrical wall of the outlet of the valve when the valve is in its closed position.

4. A fluid flow control valve according to claim 1 wherein the orifice is formed by a tortuous path between a cylindrical extension of the valve closure and a cylindrical wall of the outlet of the valve when the valve closure is in the closed position.

5. A fluid flow control valve according to claim 2 wherein, as the valve is opened, the cylindrical extension withdraws from the outlet such that, at least when the valve is fully open, the orifice ceases to be present and so does not interfere with the flow of fluid through the valve.

6. A fluid flow control valve according to claim 3 wherein, as the valve is opened, the cylindrical extension withdraws from the outlet such that, at least when the valve is fully open, the orifice ceases to be present and so does not interfere with the flow of fluid through the valve.

7. A fluid flow control valve according to claim 4 wherein, as the valve is opened, the cylindrical extension withdraws from the outlet such that, at least when the valve is fully open, the orifice ceases to be present and so does not interfere with the flow of fluid through the valve.

8. A fluid flow control valve according to claim 1 wherein each means for measuring pressure is a pressure transducer.

9. A fluid flow control valve according to claim 8 wherein each transducer is mounted externally of the valve with a respective fluid path connecting the pressure transducer to the region where the pressure is to be measured.

10. A fluid flow control valve according to claim 9 wherein the fluid paths are bores formed in the valve closure which, at their respective lower ends, open into those regions and at their respective upper ends interface with the respective pressure transducers mounted on the valve closure.

11. A fluid flow control valve according to claim 10 wherein the valve closure is a plunger or a screw-threaded spindle.

12. A fluid flow control valve according to claim 8 wherein one or more pressure transducers is mounted separately from the valve closure in the regions where the pressure is to be measured or connected to those regions by respective fluid paths.

13. A fluid flow control valve according to claim 8 wherein electrical outputs of the pressure transducers are fed to a processor programmed to calculate and give the desired leakage information.

14. A fluid flow control valve according to claim 1 wherein the first means for measuring pressure immediately upstream of the seat is omitted and said means for detecting and quantifying valve seat leakage when the valve is in its closed position determines the mass flow through any leak across the orifice.

15. A method for quantifying valve seat leakage when a fluid flow control valve is closed, the method comprising the steps of providing a fixed orifice of known size downstream of the valve seat when the valve is closed through which orifice any fluid leaking past the seat flows, measuring a first pressure upstream of the seat, measuring a second pressure between the seat and the orifice, measuring a third pressure immediately downstream of the orifice, using the second and third pressure to calculate flow through the orifice, and using the first and second pressures and the calculated flow through the orifice to determine the size of a leak path across the seat.

16. A method according to claim 15 wherein the first, second and third pressures are measured by respective pressure transducers associated with a valve closure movable relative to the valve seat.

17. A method according to claim 15 wherein the first, second and third pressures are used to provide continuous monitoring of valve seat leakage.

18. A method according to claim 15 wherein the step of measuring the first pressure upstream of the seat is omitted and the method is employed to measure the mass flow through any leak across the orifice.

19. A method for quantifying valve seat leakage when a fluid flow control is closed, the method comprising the steps of providing, at least when the valve is closed, a fixed orifice of known sized downstream of the valve seat through which orifice any fluid leaking past the seat flows, measuring a first pressure between the seat and the orifice, measuring a second pressure immediately downstream of the orifice and using the first and second pressures to calculate flow through the orifice and hence the mass flow through any leak across the valve seat.

20. A fluid flow control valve provided with means for detecting and quantifying valve seat leakage when the valve is in its closed position, said means including an orifice of known, fixed dimensions present at least when the valve is in its closed position and located downstream of the seat, through which orifice any fluid leaking past the seat flows, first means for measuring pressure between the seat and the orifice and second means for measuring pressure immediately downstream of the orifice.

* * * * *